United States Patent
Rubin et al.

(10) Patent No.: US 9,666,208 B1
(45) Date of Patent: May 30, 2017

(54) HYBRID AUDIO REPRESENTATIONS FOR EDITING AUDIO CONTENT

(71) Applicant: Adobe Systems Incorporated, San Jose, CA (US)

(72) Inventors: Michael Rubin, San Francisco, CA (US); James A. Moorer, Tallahassee, FL (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 7 days.

(21) Appl. No.: 14/968,876

(22) Filed: Dec. 14, 2015

(51) Int. Cl.
| | | |
|---|---|---|
| *G10L 15/26* | (2006.01) | |
| *G10L 21/12* | (2013.01) | |
| *G10L 25/87* | (2013.01) | |
| *G10L 21/10* | (2013.01) | |
| *G06F 3/16* | (2006.01) | |
| *G06F 3/0481* | (2013.01) | |
| *G06T 11/60* | (2006.01) | |

(52) U.S. Cl.
CPC ............ *G10L 21/12* (2013.01); *G06F 3/0481* (2013.01); *G06F 3/167* (2013.01); *G06T 11/60* (2013.01); *G10L 15/26* (2013.01); *G10L 21/10* (2013.01); *G10L 25/87* (2013.01); *G06T 2200/24* (2013.01)

(58) Field of Classification Search
CPC ... G06F 3/04847; G06F 3/0482; G09B 19/00; G09B 5/00; G09B 5/06
USPC ................ 704/235, 200, 270, 503, E15.045, 704/E21.017; 707/723
See application file for complete search history.

(56) References Cited

U.S. PATENT DOCUMENTS

| | | | |
|---|---|---|---|
| 6,374,225 B1 * | 4/2002 | Hejna, Jr. ................ | G09B 5/00 704/200 |
| 2013/0086051 A1 * | 4/2013 | Brahms ............ | G06F 17/30277 707/723 |

* cited by examiner

*Primary Examiner* — Charlotte M Baker
(74) *Attorney, Agent, or Firm* — Keller Jolley Preece

(57) ABSTRACT

The present disclosure includes a hybrid waveform system that displays a hybrid waveform to a user. In general, the hybrid waveform system provides a hybrid waveform to a user that uses converted readable text and waveforms to represent an audio segment. By providing a user with a hybrid waveform, the hybrid waveform system offers users with a number of benefits, such as providing an audio display that enables a user to quickly ascertain context information and audio information typically missing from audio transcriptions.

20 Claims, 9 Drawing Sheets

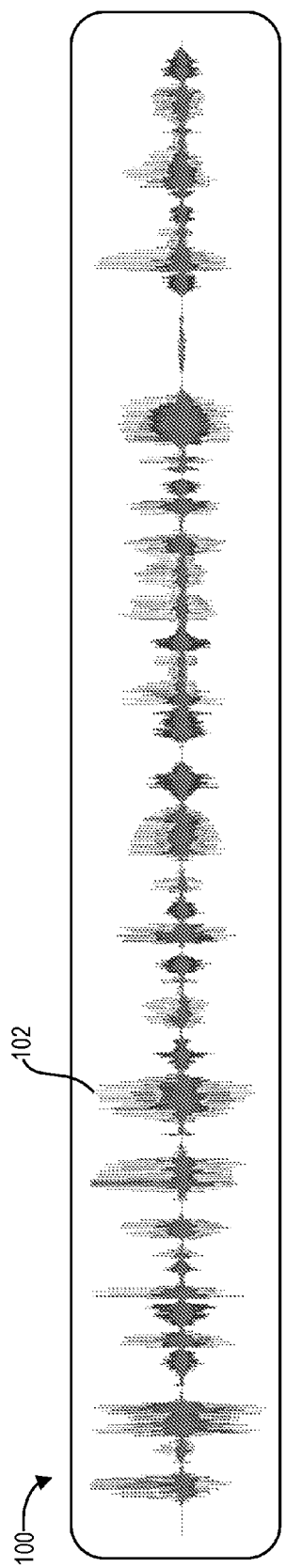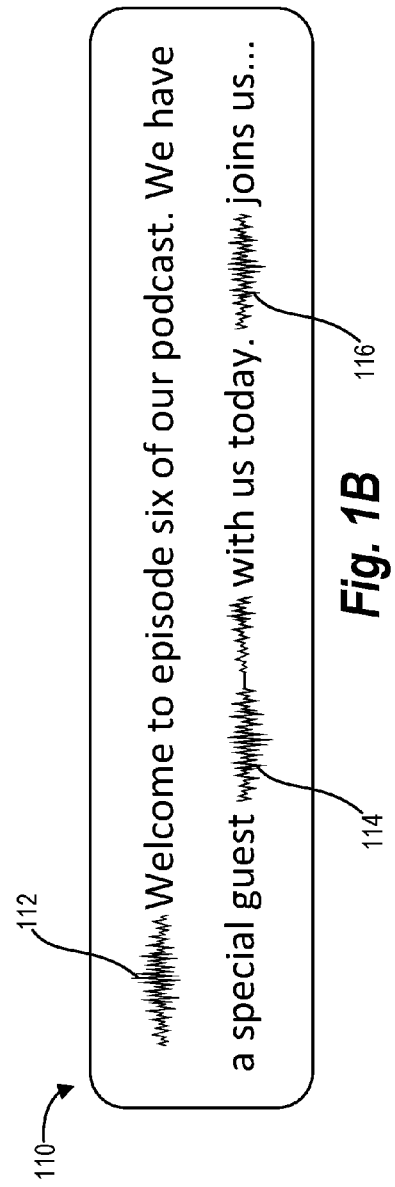
Fig. 1A
Fig. 1B

HYBRID AUDIO REPRESENTATIONS FOR EDITING AUDIO CONTENT

BACKGROUND

1. Technical Field

One or more embodiments of the present disclosure relate generally to editing audio content. More specifically, one or more embodiments of the present disclosure relate to systems and methods for displaying audio waveforms inline with text within an editing user interface.

2. Background and Relevant Art

Computing devices are useful in interacting with multimedia content, such as audio content, in many ways. For example, using a computing device, a user can capture, store, play back, and/or share audio content. In addition, computing devices allow users to edit audio by, for example, trimming unwanted noise, changing the audio characteristics for an audio file, and mixing audio together. Further, computing devices are often used to convert audio data to other types of data. For example, using a computing device, a user can transcribe audio data into text using speech-to-text ("STT") technologies and/or convert audio data to a graphical representation of the audio data (e.g., a waveform). Accordingly, conventional audio processing systems provide a number of advantages and conveniences. However, conventional audio processing systems suffer from a number of drawbacks and shortcomings as well.

For example, using conventional systems, audio editing can be difficult and confusing, especially for novice users. To illustrate, many conventional audio editing systems display audio as a continuous waveform (e.g., representing the amplitude of the audio content over time). Interacting with the waveform to perform edits can be confusing and unintuitive for users. For example, unlike video and other multimedia, audio waveforms do not contain frames or other visual cues that provide context to the user (e.g., who is speaking or when speakers change during an audio sample, where a particular phrase is in the audio sample, when the waveform is representing spoken word versus music, etc.). Oftentimes, even expert users cannot readily decipher the audio to which a waveform corresponds. As a result, even with the proper training and experience, editing audio waveforms can be a complex and cumbersome process.

Some conventional audio editing systems and methods use STT technologies to provide text derived from audio content. This may provide a user with text corresponding to words recognized in an audio sample. However, providing the text derived from an audio sample does not give any indications of time, or any other context beyond the words themselves. For example, the text does not indicate when a pause occurs between words, or when the speaker changes. Further, if there is audio content that is not recognizable as speech—such as applause, music, sound effects, or other noise—this information is not properly represented in the text transcription. Accordingly, even in systems that provide text transcriptions of the audio content, it is still difficult for the users to accurately correlate the text to the audio content or to use such information to aid in editing the audio content.

These and other problems exist with regard to displaying multimedia, and in particular, displaying audio in a manner that is convenient and understandable to all users.

BRIEF SUMMARY

Embodiments of the present disclosure provide benefits and/or solve one or more of the foregoing or other problems in the art with systems and methods for displaying and editing multimedia, particularly audio. For example, the disclosed systems and methods provide a hybrid waveform display that includes waveforms inline with text converted from recognizable speech, which makes viewing and editing audio simple and intuitive to a user. Specifically, the hybrid waveform includes text corresponding to recognizable speech and waveforms of non-recognizable audio. Further, the systems and methods can display the waveforms inline with the converted text, such that audio information from the waveforms is displayed in connection with the recognizable speech.

To illustrate, in one or more embodiments, the disclosed systems and methods identify an audio segment. Using the audio segment, the systems and methods convert one or more portions of the audio segment into text. The disclosed systems and methods then display the text within a graphical user interface provided to a user. In addition, the systems and methods display one or more waveforms (e.g., representing one or more remaining (non-speech-recognizable) portions of the audio segment) inline with the converted text.

The disclosed systems and methods provide a number of benefits over conventional audio editing systems and methods. For example, the systems and methods provide a user with a display that enables the user to quickly ascertain the context of each portion of audio, which improves the user's ability to edit the audio and/or corresponding text. In particular, the disclosed graphical user interfaces provide speech-recognizable portions of audio as text along with audio information, in the form of waveforms, for portions of the audio that are not speech-recognizable. For instance, a displayed waveform can indicate a long pause, an applause, a loud noise, music, or other sounds in the audio content that are not recognized as speech. Further, because waveforms are displayed inline with converted text, the waveforms provide additional context to the surrounding text.

In addition to providing context to audio, the disclosed systems and methods also simplify the editing process for a user. For example, the disclosed systems and methods provide text-based editing that is much easier for users than waveform-based editing. For example, using the disclosed systems, a user can easily identify and edit portions of audio content using the corresponding portions of text as a reference. In some embodiments, a user can make edits to the audio content through direct interactions with the text itself, as will be discussed below.

Additional features and advantages of exemplary embodiments of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter. The foregoing summary is not an extensive overview, and it is not intended to identify key elements or indicate a scope. Rather the foregoing summary identifies aspects of embodiments as a prelude to the detailed description presented below.

BRIEF DESCRIPTION OF THE DRAWINGS

In order to describe the manner in which the above recited and other advantages and features of the disclosed methods and systems can be obtained, a more particular description of this disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore considered to be limiting in scope, various embodiments will be described and explained with additional specificity and detail through the use of the accompanying drawings in which:

FIG. 1A illustrates an audio segment represented by a waveform in accordance with one or more embodiments;

FIG. 1B illustrates an example hybrid audio representation of the audio segment from FIG. 1A including waveforms inline with text in accordance with one or more embodiments;

DETAILED DESCRIPTION

Figure 2:
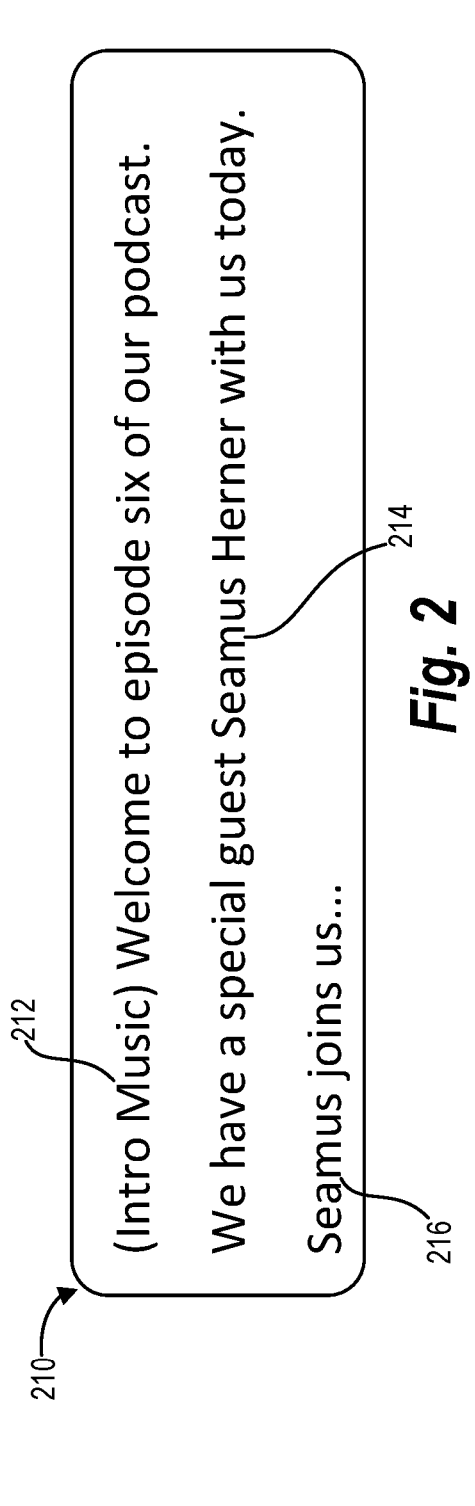
FIG. 2 illustrates an example of the hybrid audio representation of FIG. 1B with the waveforms replaced by text in accordance with one or more embodiments.

One or more embodiments of the present disclosure include a hybrid waveform system and corresponding methods for providing a user interface for interacting with audio recordings including spoken words. In particular, the hybrid waveform system provides a graphical user interface that includes a hybridized transcription of text converted from recognizable speech along with non-textual representations of non-speech-recognizable audio (e.g., pauses, ambience, background noise, etc.). The hybrid waveform system displays the non-textual representations as small waveforms inline with the transcribed text. In one or more embodiments, the non-textual representations provide audio information to a user that is otherwise missing from a conventional transcription. In many cases, the audio information is recognizable by a user from the visualization of the non-textual representations itself.

As an illustration, in one implementation, the hybrid waveform system identifies an audio segment. For example, the hybrid waveform system records or loads portions of an audio file. With the identified audio segment, the hybrid waveform system can detect recognizable speech and convert the recognizable speech into text. Next, the hybrid waveform system can display the converted text within a graphical user interface, such as within a multimedia editing program. Further, the hybrid waveform system can display one or more non-textual representations (e.g., waveforms) for non-speech-recognizable portions of the audio segment inline with the converted text.

In addition to presenting the hybrid audio representation to a user, the hybrid waveform system can also provide features for a user to edit portions of the audio segment. For example, a user can replace a displayed waveform with text or assign a descriptive label to a waveform. As another example, the user can delete converted text from the hybrid waveform and, in response, the hybrid waveform system can remove the corresponding audio from the audio segment. Further, in some embodiments, when the user applies a formatting style to portions of converted text, the hybrid waveform system modifies the acoustic characteristics of corresponding audio portions in the audio segment to match the acoustic properties associated with the formatting style.

As used herein, the term "waveform" refers to any visual and/or graphical representation of audio content. In general, a waveform displays the shape and form of a signal, such as the amplitude of audio across time. As used herein, the term "waveform" can include, but is not limited to, a spark-line, a graphic, or any other non-text visual representation of audio. In rare cases, a waveform may also include text.

The term "hybrid waveform," refers generally to a hybrid visual representation of audio content using a combination of text and waveforms. As used herein, the terms "hybrid waveform" and "hybrid audio representation" can be used interchangeably. In general, waveforms within a hybrid waveform are displayed inline with text converted using speech-to-text technologies. In other embodiments, the term "hybrid waveform" can refer to any hybrid visual representation including waveforms or other graphical elements inline with text converted from the audio.

The term "audio," as used herein, refers generally to captured and/or reproducible sound. For example, audio may be included in an audio segment. Audio may include speech as well as non-speech sounds. When included, the hybrid waveform system may recognize the speech and convert the recognizable speech into text. As used herein, the terms "audio sample" and "audio segment" refer generally to a duration of captured audio as part of an audio file, or file containing audio (e.g., an audio recording or a video having sound).

FIG. 1A illustrates an audio segment 100 represented by a waveform 102 in accordance with one or more embodiments. The hybrid waveform system may record the audio segment 100, and convert the audio segment 100 into the waveform 102. Alternatively, the hybrid waveform system may receive or otherwise access a file that includes the audio segment 100. Upon loading the audio segment 100, the hybrid waveform system can identify the waveform 102. One will appreciate that the hybrid waveform system can generate the waveform 102 using a variety of approaches and methods.

To the average user, the waveform 102 appears to be a series of waves and lines. Perhaps the user understands that the waveform 102 represents the amplitude of sound over time, but without listening to the audio segment 100, the user is unable to determine from the waveform 102 if the audio segment 100 includes recognizable speech, music, or other sounds. Further, the average user cannot gauge the length of the audio segment 100 based on the waveform 102 alone. In other words, the waveform 102 alone does not provide much indication of its contents, its duration, or the time elements with respect to the audio segment 100.

To illustrate, the waveform 102 in FIG. 1A could visually represents the following words: "Welcome to episode six of our podcast. We have a special guest Seamus Herner with us today. Seamus Herner joins us . . . ." Even with knowing that the audio segment 100 includes recognizable speech, as well as knowing the words spoken in the audio segment 100, the average user cannot easily identify where a particular spoken word is located in the corresponding waveform 102. As such, when a user is presented with only a waveform of an audio segment, the user must listen to the audio to discover the content of the audio segment. Further, the user may have to re-listen to portions of the audio multiple times while inspecting the corresponding waveform to identify which portions of the waveform 102 correspond to particular words.

FIG. 1B illustrates a hybrid waveform 110 of the audio segment 100 from FIG. 1A. As shown, the hybrid waveform 110 is a hybrid representation of the audio segment 100 and includes text as well as a first waveform 112, a second waveform 114, and a third waveform 116 (collectively referred to herein as "waveforms 112, 114, and 116"). The hybrid waveform system can detect recognizable speech within the audio segment 100 and convert the recognizable speech to text, as shown In some embodiments, audio segments include portions that the hybrid waveform system is unable to recognize as. For example, the audio can include non-speech audio (e.g., music, background noise, etc.) or unrecognizable speech. If the hybrid waveform system identifies portions of an audio segment that it does not recognize as speech, the hybrid waveform system can graphically represent these portions using waveforms inline with the recognized text. To illustrate, as shown in FIG. 1B, the first waveform 112 can represent music that does not contain recognizable speech. Thus, rather than not including the music as part of the transcription, and having the user be unaware of the information that the audio begins with a short musical interlude, the hybrid waveform system provides a visual representation of the music as the first waveform 112, which is located at the beginning of the hybrid waveform 110.

Waveforms can also be used to represent speech that is not recognizable. For example, the hybrid waveform system can use waveforms to represent names or other words that are not recognized by the system either because the audio is not clear or the words are unknown to the system. For example, in the illustrated embodiment, the second waveform 114 represents the words "Seamus Herner" and the third waveform 116 represents the word "Seamus." In this example, the hybrid waveform system has not yet learned the words "Seamus" or "Herner." Thus, as shown, the hybrid waveform system is unable to convert audio including the spoken words "Seamus" or "Herner" into text, but rather represents the audio with the second waveform 114 and the third waveform 116 in place of the unrecognizable words.

Accordingly, as shown, the hybrid waveform 110 provides a user with recognizable words in an audio segment along with waveforms from non-speech-recognizable audio (e.g., music, sound effects, background noise, unlearned words, etc.). As such, the hybrid waveform 110 enables even a novice user with the ability to identify a number of words within the audio segment 100 along with other audio information as waveforms, such as music, in their proper context.

In some embodiments, a user can edit portions of the hybrid waveform 110. To illustrate, FIG. 2 shows an example hybrid waveform 210 having the waveforms replaced by text. For instance, FIG. 2 shows the hybrid waveform 110 of FIG. 1B with the waveforms 112, 114, and 116 replaced by descriptive text 212 and text 214 216. As shown, a user may label and/or replace waveforms with text or descriptive text. Additionally, a user may label and/or replace a waveform in the hybrid waveform 110 with a tag, a symbol, a graphic, an emoji, etc. For example, the user may use an emoji in place of the descriptive text to indicate the introduction music.

As an illustration, FIG. 2 shows that the first waveform 112 from FIG. 1B has been replaced with the descriptive text 212 of "(Intro Music)." While descriptive text is shown as text within parenthesis, the hybrid waveform system can indicate descriptive text using a variety of methods, such as using italics, a different font, a different font size, etc. As another illustration, the second waveform 114 is replaced with text. In particular, the second waveform 114 is replaced with the text 214 "Seamus Herner." For instance, the hybrid waveform system may not initially recognize the name Seamus Herner, but a user, listening to the audio and recognizing the name can edit the hybrid waveform 110 by replacing the second waveform 114 with the text 214 Seamus Herner.

When a user replaces a waveform in a hybrid waveform, in some embodiments, the hybrid waveform system can learn the descriptive text, text, symbol, etc., that replaces the waveform, or portion of a waveform. To illustrate, if a user replaces the second waveform 114 with "Seamus Herner" (i.e., the text 214), the hybrid waveform system can learn that the first portion of the second waveform 114 is associated with the word "Seamus" and the second portion of the second waveform 114 represents the word "Herner." Using this learned knowledge, in one or more embodiments, the hybrid waveform system automatically replaces the third waveform 116 with the word "Seamus." Alternatively, after the learning process, the hybrid waveform system can suggest to the user to replace the third waveform 116 with the text 216 for the word "Seamus," as shown in FIG. 2.

The hybrid waveform system can use a variety of machine learning methods. For example, the hybrid waveform system can employ machine learning to identify waveform patterns. Using the identified patterns, the hybrid waveform system can better match audio to text, descriptive text, symbols, graphics, etc. For instance, the hybrid waveform system can recognize, based on learning from a number of sample waveforms, that a particular waveform represents applause. The hybrid waveform system can replace the waveform and other similar waveforms with descriptive text indicating applause. As another example, the hybrid waveform system can identify waveforms representing pauses or periods of silence and replace the waveforms with a graphic indicating the duration of the pause (e.g., a graphic of a circle around a number that indicates the length of the pause in seconds).

As still another example, the hybrid waveform system can learn words and names when a user replaces waveforms in the hybrid waveform with the words and text. As such, each time a user replaces a waveform in the hybrid waveforms with text, the hybrid waveform system can create an association between the waveform or corresponding audio and the provided text. Further, the hybrid waveform system can combine learning from multiple user edits over time as well as combine edits from multiple users. Using the aggregate learning, the hybrid waveform system can better recognize patterns and improve accuracy when generating hybrid waveforms.

In addition to replacing waveforms into text, descriptive text, symbols, etc., the hybrid waveform system also enables a user to edit audio in the audio segment associated with the hybrid waveform. In particular, the hybrid waveform system can enable a user to edit the audio in an audio segment by modifying the corresponding hybrid waveform. In other words, a user can make changes to text in the hybrid waveform, and in response, the hybrid waveform system can modify corresponding audio in the audio segment.

Figure 3:
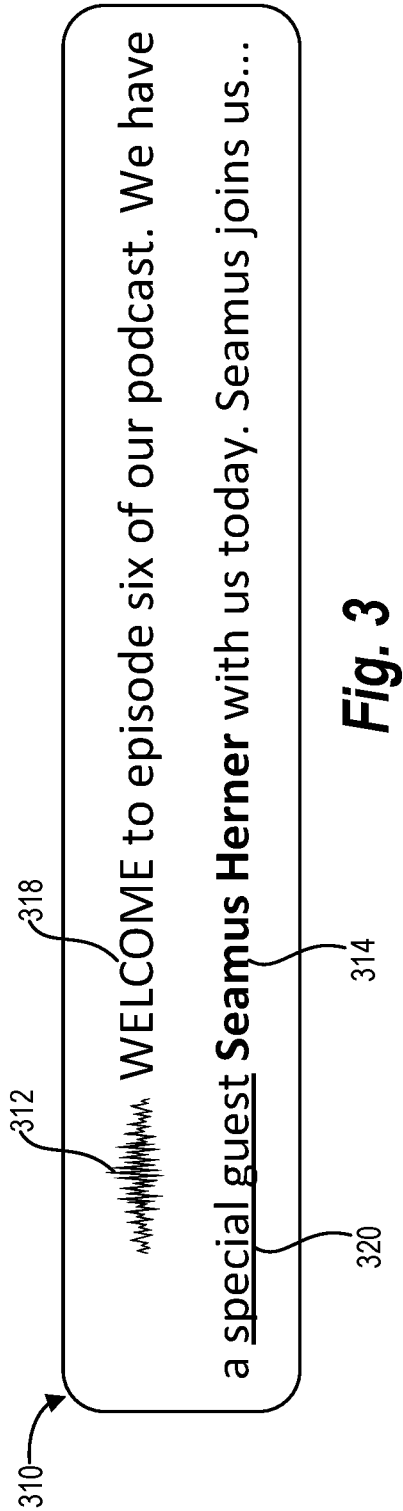
FIG. 3 illustrates an example hybrid audio representations with formatting applied in accordance with one or more embodiments.

To illustrate, FIG. 3 shows an example hybrid waveform 310 with formatting applied to portions of text within the hybrid waveform 310. The hybrid waveform 310 shown in FIG. 3 can be an example embodiment of the hybrid waveform 110 shown and described with respect to FIG. 1B. In one example, the hybrid waveform 310 is taken from the audio shown in FIG. 1A, and the first waveform 112 in FIG. 1B matches the waveform 312 in FIG. 3.

As mentioned, in one or more embodiments, the hybrid waveform system allows the user to make edits to the audio by making edits to the text of the hybrid waveform 310. To illustrate, a user can apply text formatting to a portion of the hybrid waveform 310 to modify acoustical characteristics of the corresponding audio. In one example embodiment, in response to a user capitalizing letters in a word, the hybrid waveform system increases the volume of the audio associated with the word. For instance, if a user changes the formatting of the word "WELCOME" 318 to all upper case, the hybrid waveform system increases the volume (i.e., amplitude) of the corresponding portion of the audio segment. Alternatively, changing a word to upper case can represent a different acoustic change, such as time stretching or extending the length of a word (e.g., slowing down the audio speed without affecting the pitch), adding reverberations (e.g., an echo or chorus) to a word, etc.

The hybrid waveform 310 shows other format modifications, such as to the words "special guest" 320 and "Seamus Herner" 314. In particular, the hybrid waveform 310 shows that "special guest" 320 is underlined and "Seamus Herner" 314 is bolded. In one or more embodiments, when a user underlines text, the hybrid waveform system modifies the pitch (e.g., pitch scaling or pitch shifting) of the corresponding audio. Alternatively, when a user underlines text, the hybrid waveform system can apply an echo to the corresponding audio. In some embodiments, underlying can be associated with flanging or phasing to the corresponding audio. For bolded text, the hybrid waveform system can add sound effects, such as a robot voice, a 3D audio effect, or a reverse echo. One will appreciate that each formatting style can be associated with any of a number of different acoustic changes.

The hybrid waveform system can set default acoustic modifications for each particular formatting style. Additionally, the hybrid waveform system can allow a user to specify which formatting style is associated with which audio effects. Further, a number of additional format changes can be used, such as changing fonts, font sizes, font color, etc., and the hybrid waveform system can associate each formatting style with a particular acoustic change. In some embodiments, a user can associate a single formatting style with multiple acoustic changes (e.g., italicizing text decreases the pitch and lengthens the duration of the corresponding audio).

Moreover, in many embodiments, a user can apply more than one formatting style to the same portion of the hybrid waveform 310, and in response, the hybrid waveform system can apply multiple acoustic effects to the corresponding audio portion. For example, if a user both bolds and increases the font size of a phrase of text in the hybrid waveform 310, in one embodiment the hybrid waveform system can increase the volume and add a sound a robot voice to the corresponding audio portion. Further, when a user applies one formatting style to text, the hybrid waveform system may suggest other complementary formatting styles that the user can apply to the same text, or adjacent text.

Figure 4A:
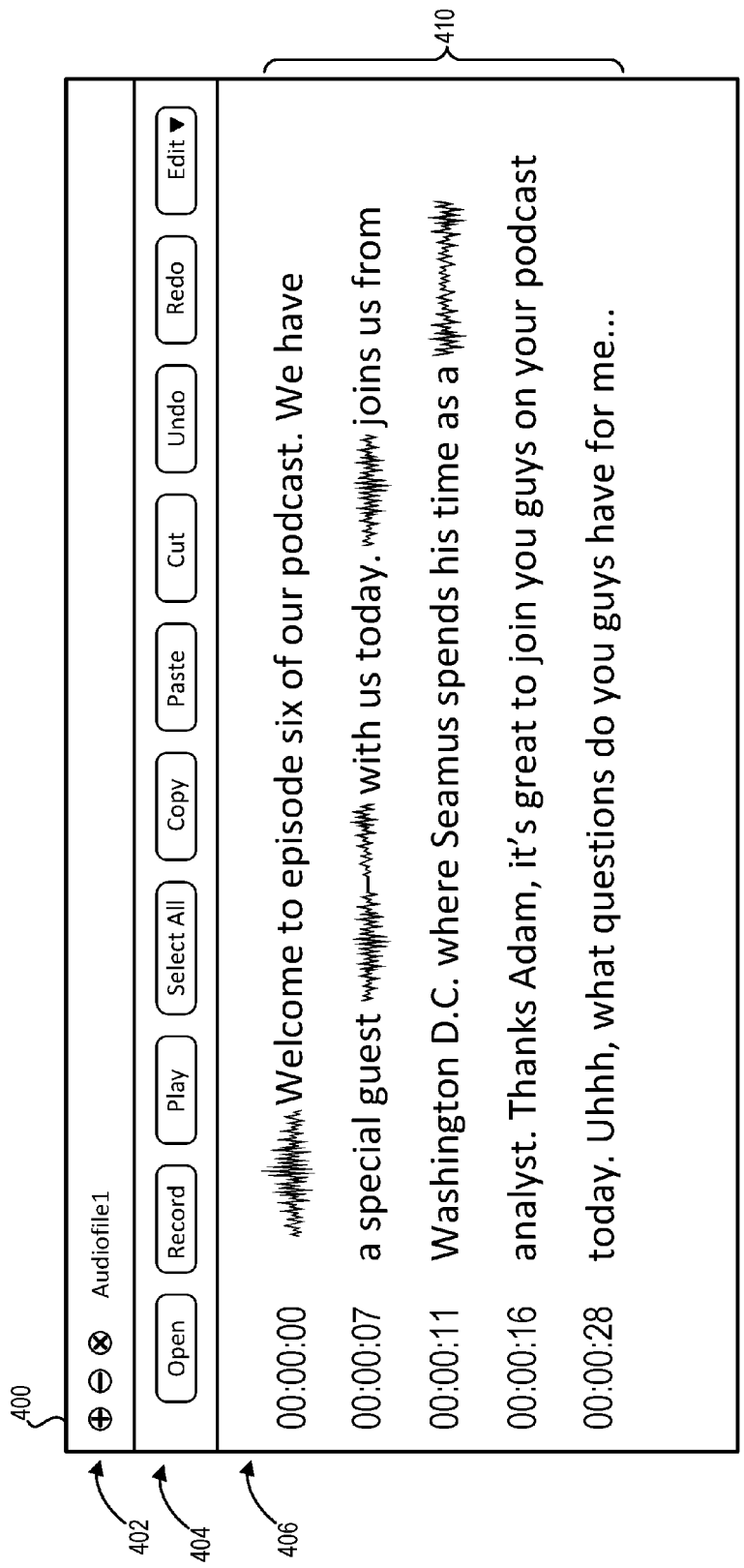
FIGS. 4A-B illustrate an example graphical user interface displaying a hybrid audio representation in accordance with one or more embodiments.
Figure 4B:
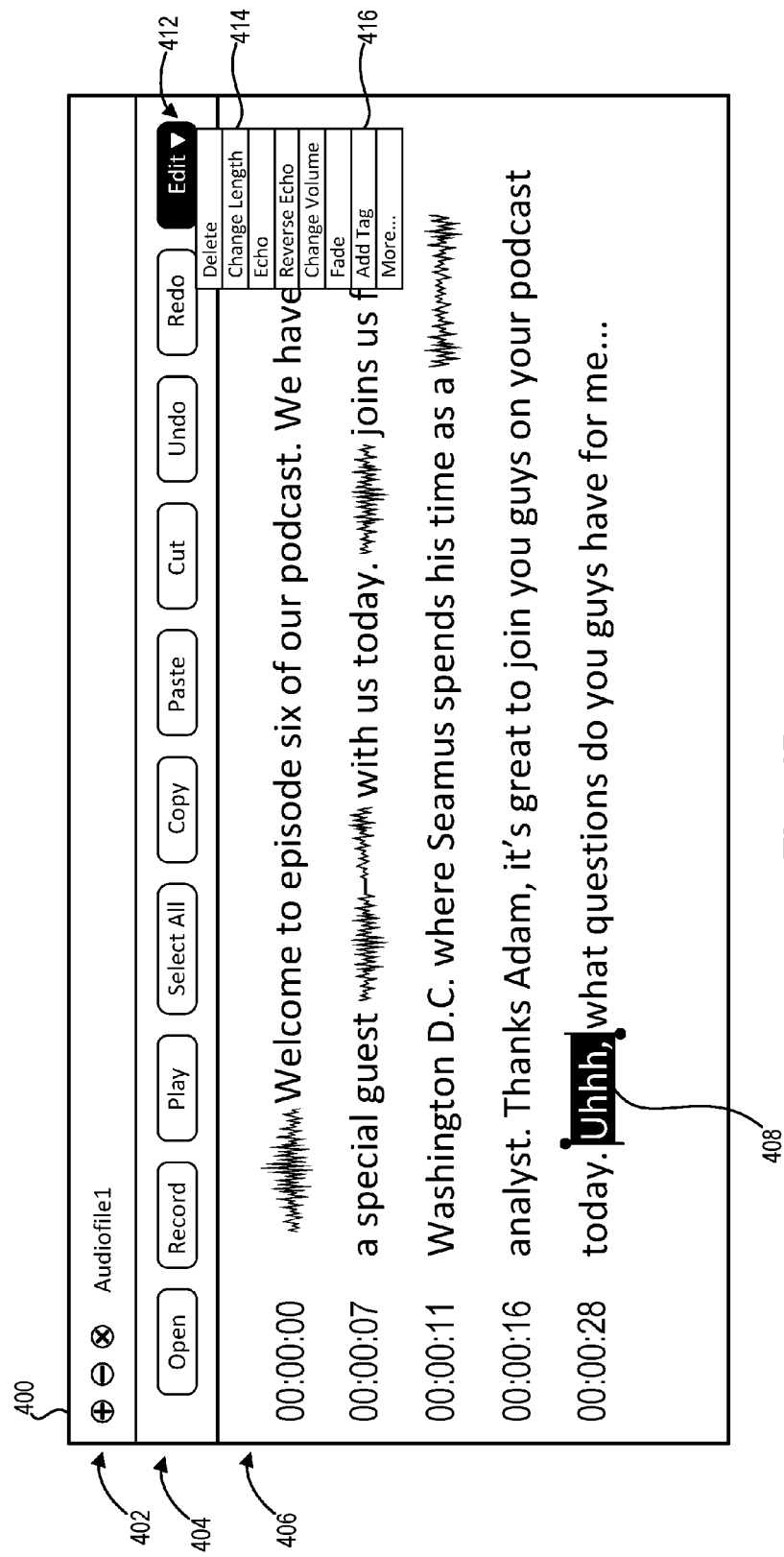

As mentioned above, the hybrid waveform system can display a hybrid waveform to a user within a graphical user interface. To illustrate, FIGS. 4A-B show an example graphical user interface 400 that allows a user to interact with a hybrid waveform 410. The graphical user interface 400 can include a header 402 showing the file name and a toolbar 404 having various menu options. The graphical user interface 400 can also include a body portion 406 that displays the hybrid waveform 410. Along with displaying the hybrid waveform 410, the body portion 406 can display timestamps associated with the hybrid waveform 410. For example, the timestamps in the body portion 406 provide a general indication of time duration to a user.

The graphical user interface 400 enables a user to edit and modify the hybrid waveform 410 and corresponding audio. For example, the menu options in the toolbar 404 enable a user to capture and/or load audio, which the hybrid waveform system uses to generate the hybrid waveform 410. The menu options also allow a user to copy, cut, and paste portions of the hybrid waveform 410 as well as playback audio associated with an edited hybrid waveform.

A user may select words and/or waveforms within the hybrid waveform 410 and apply edits to the selection. To illustrate, FIG. 4B shows the graphical user interface 400 with selected text 408 (i.e., the selection of the text "Uhhh") within the hybrid waveform 410. For instance, upon the user selecting the selected text 408, the user may delete the selection. In one or more embodiments, in response to the user deleting the selected text 408, the hybrid waveform system removes the words "Uhhh" from the hybrid waveform 410. The hybrid waveform system also removes the corresponding audio portion from the audio segment. In this manner, the user can edit the audio segment by modifying the text and/or waveforms in the hybrid waveform 410.

As another example, the user can move text within the hybrid waveform 410 or add text from another hybrid waveform. For example, the user can import text into the hybrid waveform 410 from another hybrid waveform. In response to the user adding text from another hybrid waveform, the hybrid waveform system can add the corresponding audio portion(s) from the other audio segment into the audio segment associated with the hybrid waveform 410. Further, in some embodiments, the hybrid waveform system can automatically apply filters, fades, and/or other modifications to create smooth transitions when adding or moving audio in the hybrid waveform 410.

Further, as described above with respect to the previous figures, the hybrid waveform system can allow a user to modify audio in the hybrid waveform 410 by changing the format of text and/or waveforms within the body portion 406 of the graphical user interface 400. To illustrate, FIG. 4B also shows the edit menu option 412 selected within the toolbar 404 of the graphical user interface 400. Using the edit menu option 412, the user can apply formatting changes to the hybrid waveform 410. For example, the user can select the word "welcome" and choose the option within the dropdown menu of the edit menu option 412 to lengthen the duration of the audio (i.e., "Change Length" 414). In response, the hybrid waveform system can apply the associated formatting style to the word "welcome" (e.g., the hybrid waveform system can italicize the word "welcome"

in the hybrid waveform 410 based on the italics formatting style being associated with audio length modifications). Additionally, and/or alternatively, the user can directly apply a formatting style to selected text in the hybrid waveform 410, such as by using shortcuts or by applying other format styling options. For example, the user can directly apply formatting changes to the text and the hybrid waveform system can make the corresponding acoustic changes to the audio segment.

The edit menu option 412 also shows an option to add a tag 416 to selected text. Tagging allows a user to associate one or more attributes with text and/or waveforms within the hybrid waveform 410. For example, if an audio segment has multiple speakers, a user may tag each instance of when a particular speaker is talking. Then, the user can use the tags to filter just text and/or waveforms associated with the particular speaker. Additionally, the user can use tags to otherwise organize portions of audio within an audio segment via the graphical user interface 400 and the hybrid waveform 410.

As described above, the hybrid waveform system can apply acoustic modifications to audio based on user formatting or otherwise editing portions of a hybrid waveform. In some embodiments, the hybrid waveform system can detect and automatically apply formatting from an audio segment. To illustrate, FIG. 5 shows a an example of how the hybrid waveform system automatically detects audio characteristics of an audio segment and provides a formatted hybrid waveform 510 of the audio segment to a user in a graphical user interface 500.

Figure 5:
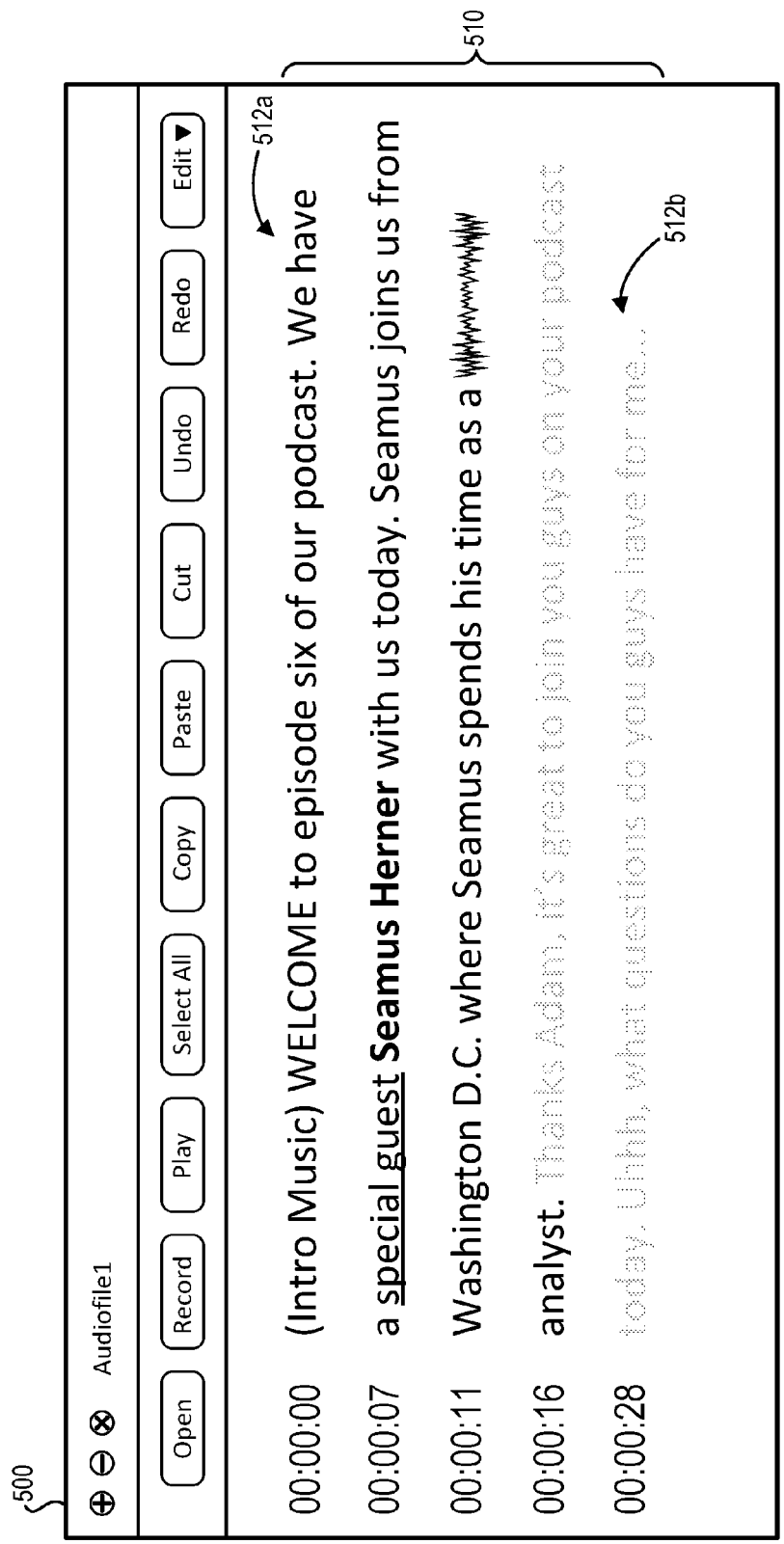
FIG. 5 illustrates an example of a hybrid audio representation including formatting corresponding to audio characteristics of an audio segment in accordance with one or more embodiments.

Specifically, FIG. 5 shows how the hybrid waveform system can detect acoustic characteristics and automatically add descriptive text as well as format text within the hybrid waveform 510. As described above, the hybrid waveform system can use learning to better identify waveforms and associate those waveforms with text, descriptive text, symbols, acoustic characteristics, etc. For example, the hybrid waveform system can learn that a particular waveform or audio pattern represents introductory music often used by the user. As such, each time the hybrid waveform system detects that particular waveform in an audio segment, the hybrid waveform system can replace the waveform with the descriptive text of "Intro Music."

As another example, the hybrid waveform system can analyze and recognize when audio has a particular characteristic. For instance, the hybrid waveform system can detect an increase in amplitude (e.g., volume) for a word or phrase in the audio segment, and in response, can apply the proper formatting to the corresponding text in the hybrid waveform 510 to indicate the detected audio characteristic to the user. For example, if the hybrid waveform system detects a robot voice speaking the words "Seamus Herner," the hybrid waveform system can bold "Seamus Herner" in the formatted hybrid waveform 510. Similarly, if the hybrid waveform system detects that the word "Welcome" is spoken very loudly in the audio segment, the hybrid waveform system can change the format of the word "Welcome" to be all caps, as shown.

Using the formatted hybrid waveform 510, the user can further modify the audio segment via the graphical user interface 500. For instance, the hybrid waveform system detects an echo in the audio of the words "special guest," and as such, the hybrid waveform system underlines the words "special guest" in the formatted hybrid waveform 510. If the user desires to cancel out the echo, the user can select the text "special guest" and remove the underlining (e.g., by selecting reverse echo in the edit menu drop down options or by using direct format changing, such as using the shortcut keys Ctrl+U or by using a font formatting menu/option). In response, the hybrid waveform system can remove the echo. Further, if the user wanted to apply other acoustic modifications, the user could change the formatting style of selected text, as described above.

In some embodiments, the hybrid waveform system can also detect each speaker within an audio segment. For example, the hybrid waveform system can color the text within the hybrid waveform 510 based on which speaker is talking. For instance, if there are two speakers in an audio segment, the hybrid waveform system can automatically color, code, and/or tag text associated with one speaker blue and text associated with the other speaker red. To illustrate, as shown in FIG. 5, text associated with Speaker A 512*a* is coded with one color of text, while text associated with Speaker B 512*b* is coded with a different color of text.

Further, in one or more embodiments, the hybrid waveform system can use the same color for the same speaker across multiple audio segments. For example, Speaker B can also be coded with red text in other hybrid waveforms. Similarly, in various embodiments, the hybrid waveform system can detect various phonemes and sound types within an audio segment. Based on the detected sound type, the hybrid waveforms can color, code, and/or tag text and waveforms accordingly.

Figure 6:
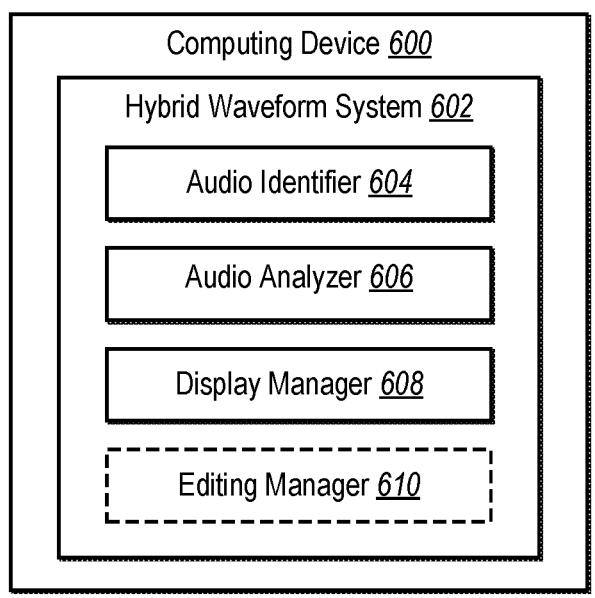
FIG. 6 illustrates an example schematic diagram of a computing device that implements an example hybrid audio representation system in accordance with one or more embodiments.

FIG. 6 illustrates an example schematic diagram of a computing device 600 that implements an example hybrid waveform system 602 according to one or more embodiments. The computing device 600 can represent a variety of computing devices. For example, the computing device 600 may be a mobile device (e.g., a mobile telephone, a smartphone, a PDA, a tablet, a laptop, a camera, a tracker, a watch, a wearable device, etc.). In some embodiments, the computing device 600 may be a non-mobile device (e.g., a desktop computer or another type of client device). In yet further embodiments, the computing device 600 may be a server device that is remotely accessible by users. Additional details with respect to the computing device 600 are discussed below with respect to FIG. 9.

The illustrated hybrid waveform system 602 is one embodiment of the hybrid waveform system described above with respect to the other figures. For example, and as described below, the hybrid waveform system 602 can perform the functions and operations of providing a hybrid waveform to a user in a graphical user interface and allowing the user to interact with the hybrid waveform as set forth above. As such, the hybrid waveform system 602 can include various components for performing the processes and features described herein.

As shown in FIG. 6, the hybrid waveform system 602 includes an audio identifier 604, an audio analyzer 606, and a display manager 608. In some embodiments, the hybrid waveform system 602 can optionally include an editing manager 610. In general, the audio identifier 604 obtains at least one audio segment; the audio analyzer 606 converts recognizable speech to text and/or converts other audio to graphical representations, such as waveforms; the display manager 608 displays a hybrid waveform using the converted text and waveforms within a graphical user interface; and the editing manager 610 can allow a user to edit the audio segment and/or modify acoustic characteristics of the audio segment via the hybrid waveform within the graphical user interface.

The components 604-610 of the hybrid waveform system 602 can comprise software, hardware, or both. For example, the components 604-610 can comprise a plurality of instructions stored on a computer-readable storage medium and executable by processors of at least one computing device, such as a client device or server device. When executed by the processors, the computer-executable instructions of the hybrid waveform system 602 can cause the computing device(s) to perform the feature learning methods described herein. Alternatively, the components 604-610 can comprise hardware, such as a special purpose processing device to perform a certain function or group of functions. Additionally or alternatively, the components 604-610 of the hybrid waveform system 602 can comprise a combination of computer-executable instructions and hardware.

As mentioned above, the hybrid waveform system 602 includes an audio identifier 604. In one or more embodiments, the audio identifier 604 receives at least one audio segment. For example, the audio identifier 604 loads an audio segment from a file, such as an audio file or a video file. Alternatively, the audio identifier 604 captures or records an audio segment, such as using a microphone on the computing device 600.

The audio identifier 604 can also convert audio segments to waveforms. More specifically, the audio identifier 604 can create a visual representation of the audio segment (e.g., waveform), which shows the amplitude and/or frequency of the audio segment over time. An example of a waveform is shown in FIG. 1 above.

In one or more embodiments, the audio identifier 604 can create a continuous waveform of an audio segment. In other embodiments, the audio identifier 604 can create separate waveforms for each audio unit in the waveform. As used herein, an "audio unit" refers to the smallest portion of audio that can be seamlessly edited. In some cases, the audio identifier 604 can represent each word as an audio unit. Alternatively, the audio identifier 604 can create a separate waveform each time the audio falls below a threshold decibel level or falls to around zero decibels. Further, in some embodiments, the audio identifier 604 can first create a continuous waveform and later divide the continuous waveform into smaller audio units.

The audio analyzer 606 can detect recognizable sounds in the audio segment. For example, the audio analyzer 606 detects recognizable speech in the audio segment. Upon detecting recognizable speech, the audio analyzer 606 can convert the recognizable speech into text or words. Thus, in other words, the audio analyzer 606 can perform speech-to-text conversions of spoken portions of an audio segment.

In addition to detecting recognizable speech, the audio analyzer 606 can detect other recognizable sounds. For example, the audio analyzer 606 can detect particular noises such as pauses, applause, a gunshot, clap, and other sound effects. Further, the audio analyzer 606 can detect when music is playing along with identifying information associated with the music (e.g., song title, artist, album art, etc.). In addition, as described above, the hybrid waveform system 602 can use machine learning and other methods to detect speech and other sounds. Thus, as users identify unknown sounds, the audio analyzer 606 can use the identified sounds to create and learn patterns, which the audio analyzer 606 can then use when detecting waveforms in future audio segments.

When the audio analyzer 606 detects recognizable sounds other than speech, in various embodiments, the audio analyzer 606 can tag the recognizable sounds with descriptive text. For example, upon recognizing applause (e.g., a learned audio pattern), the audio analyzer 606 can tag and replace the waveform representing the applause with descriptive text indicating applause in the audio segment. In other words, by replacing the waveform of the recognizable sound with descriptive text, the audio analyzer 606 indicates to the display manager 608 to display the descriptive text in place of the waveform within the hybrid waveform. As another example, upon recognizing music from a particular album, the audio analyzer 606 can replace the music waveform with album art such that the display manager 608 displays the album art in place of the music waveform.

In some embodiments, the audio analyzer 606 can detect when an audio segment falls below a threshold level and/or remains under the threshold level for a specified duration of time. For example, when the speaker in an audio segment pauses for a few seconds, the audio analyzer 606 can detect the pause based on determining that the audio in the audio segment has dropped below a threshold decibel level for a specified duration (e.g., 0.5 seconds, 1 second, etc.)

In one or more embodiments, the audio analyzer 606 can automatically edit portions of the audio segment. For example, the audio analyzer 606 can trim out unwanted audio as defined by a user (e.g., specified in a user preference). For instance, the audio analyzer 606 can detect when the audio segment contains throwaway words such as "uh," "umm," "err," and "just like" and remove these throwaway words. Further, the audio analyzer 606 can detect when a phrase of words is repeated, such as when a user begins a sentence with a few words, and then repeats the same words. Additionally, the audio analyzer 606 can trim out or reduce the length of pauses beyond a threshold duration. One will appreciate that the audio analyzer 606 can detect and trim out numerous audio portions of the audio segment, as specified by the user.

The display manager 608 can display a graphical user interface that shows a hybrid waveform. The display manager 608 can display the converted text, descriptive text, and/or waveform with a hybrid waveform. An example of a hybrid waveform is shown in FIG. 1B as well as in FIGS. 2-5. For example, FIG. 4A shows a hybrid waveform 410 within a graphical user interface 400.

In general, when displaying waveforms within a hybrid waveform, the display manager 608 resizes the waveforms to match the size of the text. In many instances, the resized waveforms are not drawn to scale. For example, the display manager 608 can shrink the height of the waveform to better match the height of the text while maintaining the width of a waveform. In some embodiments, the display manager 608 can display the waveform as a simplified graphic, such as a spark line.

In various embodiments, the display manager 608 can pair a waveform with text. For example, the display manager 608 can initially display converted text of recognizable speech or descriptive text or a recognizable sound. Upon a user selecting the text, the display manager 608 can provide the waveform associated with the selected text. In some embodiments, the display manager 608 can display both waveforms and corresponding text together in a hybrid waveform, such as the text above or below the waveform, or the text superimposed on the waveform.

As shown above, the display manager 608 can provide menu options within the graphical user interface. For example, FIG. 4B shows menu options in a toolbar 404 such as opening or recording an audio segment, playing audio, copy and pasting selected portions, and editing selected portions. The editing menu option can include further options, such as modifying acoustic characteristics of audio within the audio segment. When a user applies acoustic modifications, the display manager 608 can provide a visual representation of the acoustic modifications by applying formatting changes to the text within the hybrid waveform, as described above.

Further, when the audio analyzer 606 detects that different speakers are talking in an audio segment, the display manager 608 can display converted text from each speaker in a different color. Likewise, the display manager 608 can display descriptive text with a plurality of colors. As such, the display manager 608 can enable a user to quickly identify when the audio segment switches between speakers and when recognizable non-speech sounds occur. Alternatively, the display manager 608 can use color-coding to display various phonemes and sound types, as detected by the audio analyzer 606.

In some, the display manager 608 can display when multiple speakers are talking at once. For example, the graphical user interface displays overlapping text when the audio analyzer 606 detects two speakers talking at the same time. As a note, the display manager 608 will generally only display overlapping speakers when the audio analyzer 606 detects two speakers simultaneously and can isolate each speaker, or when a user manually labels a waveform within the hybrid waveform as including multiple speakers. Further, in various embodiments, the display manager 608 allows a user to edit each speaker individually, such as to remove one of the overlapping speakers, or two shift one of the speakers down in time so that the speakers no longer overlap.

The editing manager 610, when available, can allow a user to edit and modify an audio segment. As described above, the editing manager 610 can enable a user to copy, cut, move, and insert audio within an audio segment based on editing the hybrid waveform. Thus, if a user trims a sentence of text from the hybrid waveform, the editing manager 610 can remove the corresponding audio from the audio segment. Further, as the user applies formatting to text within the hybrid waveform, the editing manager 610 can apply acoustic modifications to the corresponding audio, as described above.

Figure 7:
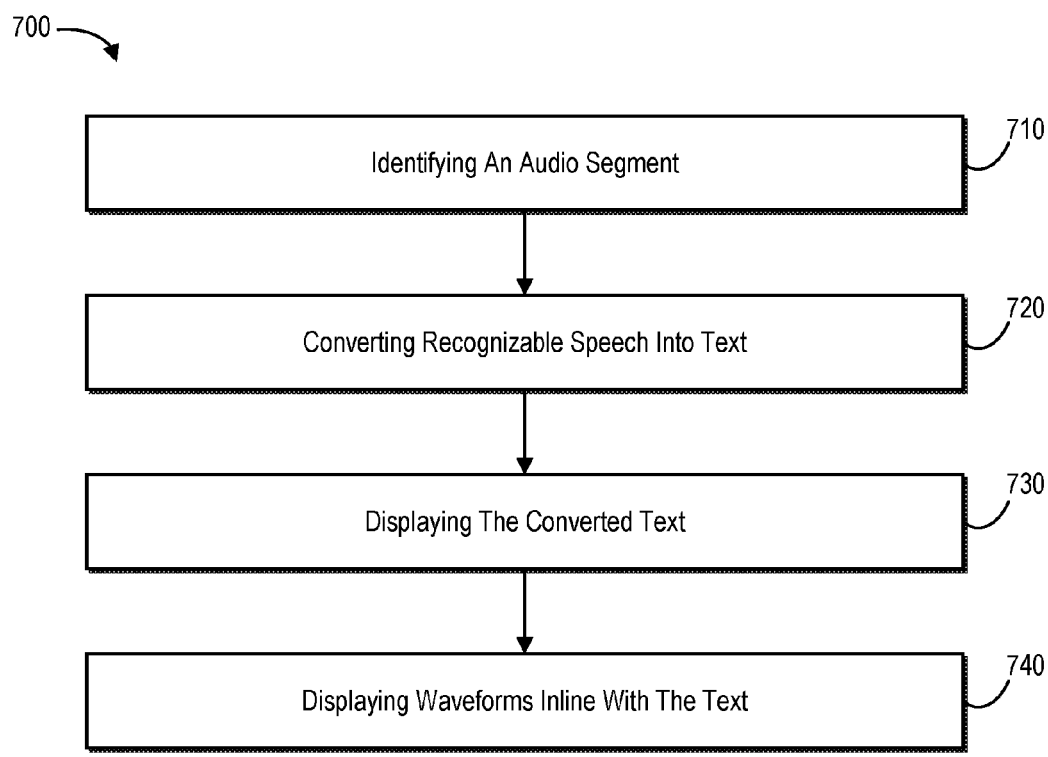
FIG. 7 illustrates a flowchart of a series of acts in a method for viewing and editing multimedia in accordance with one or more embodiments.
Figure 8:
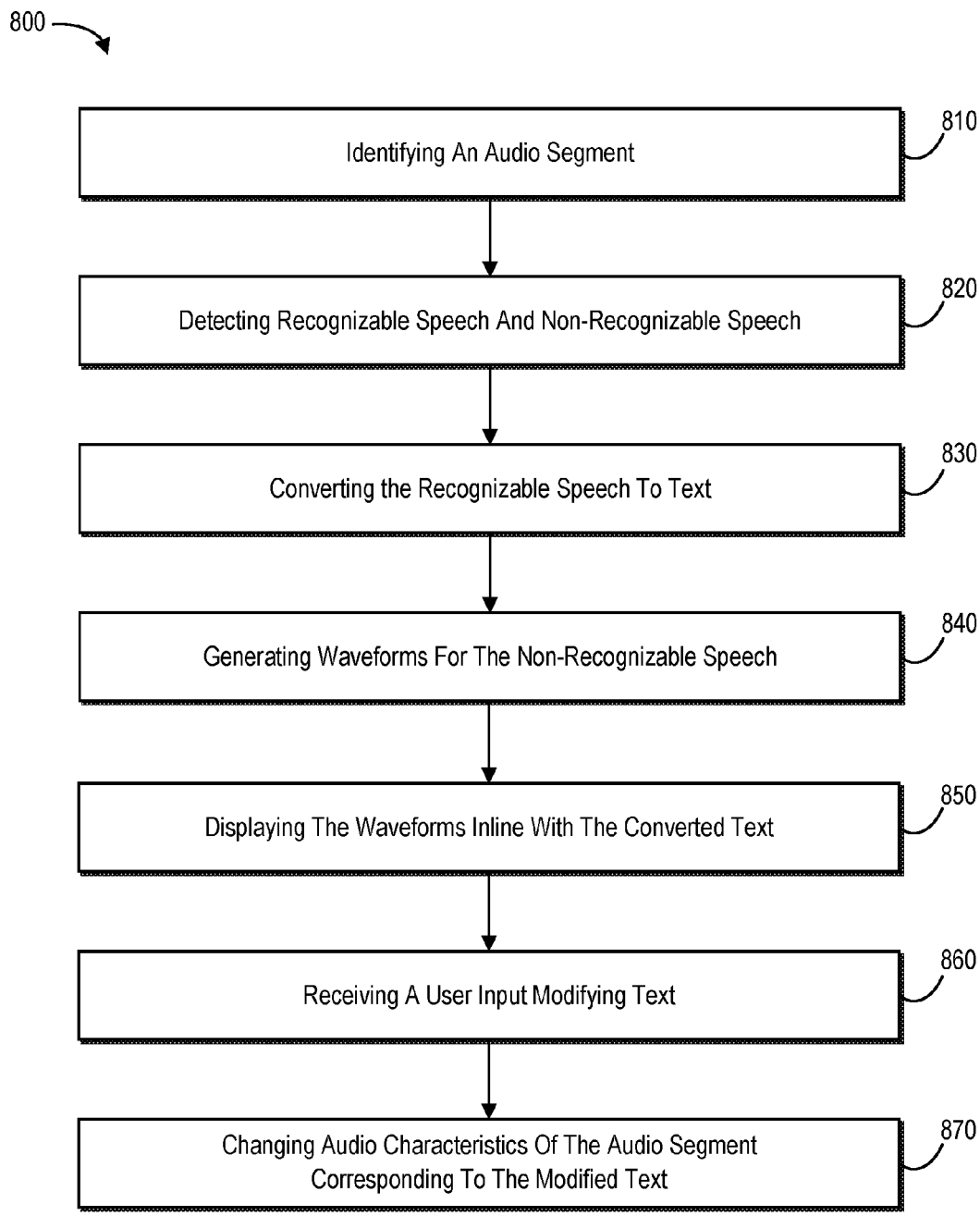
FIG. 8 illustrates a flowchart of a series of acts in another method for viewing and editing multimedia in accordance with one or more embodiments.

FIGS. 1-6, the corresponding text, and the examples, provide a number of different systems and devices for displaying a hybrid waveform in accordance with one or more embodiments. In addition to the foregoing, one or more embodiments can also be described in terms of flowcharts comprising acts and steps in a method for accomplishing a particular result. For example, FIGS. 7 and 8 illustrate flowcharts of exemplary methods in accordance with one or more embodiments. The methods described in relation to FIGS. 7 and 8 may be performed with less or more steps/acts or the steps/acts may be performed in differing orders. Additionally, the steps/acts described herein may be repeated or performed in parallel with one another or in parallel with different instances of the same or similar steps/acts.

FIG. 7 illustrates a flowchart of a series of acts in a method 700 for viewing and editing multimedia. The method 700 can be performed in a digital medium environment for creating and/or editing audio content. In some example embodiments, a computing device and/or a server device performs the method 700 for viewing and editing multimedia, and in particular, using hybrid waveforms.

The method 700 includes an act 710 of identifying an audio segment 100. In particular, the act 710 of identifying an audio segment 100 may involve downloading, copying, reading, or otherwise loading an audio segment 100. Alternatively, the act 710 may involve capturing and/or recording an audio segment 100. Further, in some embodiments, the act 710 may involve identifying an additional audio segment, or portion thereof, and loading the audio segments together.

The method 700 further includes an act 720 of converting recognizable speech into text. In particular, the act 720 may involve converting at least one speech-recognizable portion of the audio segment 100 into readable text. For example, the act 720 may involve using speech-to-text conversion to convert recognizable speech in to readable text. In one or more embodiments, the act 720 may involve detecting that an audio segment 100 includes multiple speakers and detecting when each of the speakers are talking.

In addition, the method 700 includes an act 730 of displaying the converted text. In particular, the act 730 may involve displaying the converted readable text within a graphical user interface 400. For example, the converted readable text displayed within the graphical user interface 400 may form a first part of a hybrid waveform 410. In addition, the act 730 may include coding the readable text within the graphical user interface 400 according to speaker when the audio segment includes multiple speakers.

The method 700 also includes an act 740 of displaying waveforms inline with the text. In particular, the act 740 may involve displaying, within the graphical user interface 400 and inline with the readable text, at least one waveform 112, 114, and 116 representing at least one remaining (i.e., non-speech-recognizable) portion of the audio segment 100. In addition, the at least one non-speech-recognizable portions of the audio segment 100 may provide a visual representation of the corresponding audio. Further, the inline waveforms 112, 114, and 116 displayed within the graphical user interface 400 can match the height of the displayed readable text.

In one or more embodiments, the method 700 may include an act of determining the at least one non-speech-recognizable portion of the audio segment based on the at least one non-speech-recognizable portion satisfying an audio threshold. For instance, the audio threshold can correspond to an amplitude threshold or a waveform length/duration threshold. In various embodiments, the method 700 may include an act of detecting, from the non-speech-recognizable portion of the audio segment, a learned audio pattern and replacing a waveform of the at least one waveform with descriptive readable text describing the learned audio pattern. Similarly, in some embodiments, the method 700 may include an act of tagging a waveform of the at least one non-speech-recognizable portion of the audio segment with an audio tag.

In some embodiments, the method 700 may include an act of receiving input deleting a portion of text, and deleting the corresponding audio from the audio segment. In additional, or alternative embodiments, the method 700 may include an act of receiving input modifying the format of a portion of readable text, and changing the audio characteristics of the corresponding audio in the audio segment. Further, in some instances, changing the audio characteristics includes changing the amplitude, duration, pitch, fade, reverberation, or modulation of the audio to which the portion of readable text corresponds.

FIG. 8 illustrates a flowchart of a series of acts in another method 800 for viewing and editing multimedia. The method 800 can be performed in a digital medium environment for creating and/or editing hybrid waveforms. In some example embodiments, a computing device and/or a server device performs the method 800 for viewing and editing multimedia, and in particular, hybrid waveforms.

The method 800 includes an act 810 of identifying an audio segment 100. In particular, the act 810 of identifying an audio segment 100 may involve downloading, copying, reading, or otherwise loading an audio segment 100. Alternatively, the act 810 may involve capturing and/or recording an audio segment 100. Further, in some embodiments, the act 810 may involve identifying an additional audio segment, or portion thereof, and loading the audio segments together.

The method 800 further includes an act 820 of detecting recognizable speech and non-recognizable speech. In particular, the act 820 may involve detecting recognizable speech and non-recognizable speech within the audio segment 100. For example, the act 820 may involve using speech-to-text detection to detect recognizable speech and convert the detected speech into readable text.

In addition, the method 800 includes an act 830 of converting the recognizable speech to text. In particular, the act 830 may involve converting the detected recognizable speech to readable text. The act 830 may involve converting the detected recognizable speech to readable text in any suitable manner as described herein.

The method additionally includes an act 840 of generating waveforms for the non-recognizable speech. In particular, the act 840 may involve generating a plurality of waveforms for the non-recognizable speech. The act 840 may involve generating a plurality of waveforms for the non-recognizable speech portions of the audio in any suitable manner as described herein.

The method 800 also includes an act 850 of displaying the waveforms 112, 114, and 116 inline with the converted text. In particular, the act 840 may involve displaying, within a graphical user interface 400, the plurality of waveforms 112, 114, and 116 for the non-recognizable speech inline with the converted readable text. In addition, the act 850, in some embodiments, involves comprising grouping, within the graphical user interface 400, or separating each portion of readable text and each waveform into an audio unit and, in some cases, enabling a user to individually edit each audio unit.

The method 800 may include an act 860 of receiving input modifying text. In particular, the act 860 can include receiving a user input modifying a portion of readable text from the displayed readable text. For example, a user may provide a formatting change to a portion of readable text where the formatting change indicates a corresponding audio characteristic modification. In some embodiments, a user uses a graphical user interface 400 to provide input modifications.

Further, the method 800 includes an act 870 of changing audio characteristics of the audio segment corresponding to the modified text. In particular, the act 870 can include changing at least one audio characteristic of an audio portion in the audio segment corresponding to the portion of modified readable text based on the received input. The act 870 can change at least one audio characteristic of a audio portion in the audio segment corresponding to the portion of modified readable text based on the received input in any suitable manner, as described herein.

In one or more embodiments, the method 800 may involve detecting that an audio segment 100 includes multiple speakers and detecting when each of the speakers are talking. Further, the act 820 may involve detecting, in connection with detecting the recognizable speech, acoustic characteristics of the audio corresponding to the recognizable speech. Further, in some embodiments, the method 800 can also involve modifying formatting for at least one portion of readable text within a graphical user interface 500 based on the corresponding detected acoustic characteristics.

In various embodiments, the method 800 may involve receiving input modifying the format of a portion of readable text, and changing the audio characteristics of the corresponding audio in the audio segment. For instance, changing the audio characteristics of the corresponding audio may include changing the amplitude, duration, pitch, or modulation of the audio to which the portion of readable text corresponds.

Embodiments of the present disclosure may comprise or utilize a special purpose or general-purpose computer including computer hardware, such as, for example, one or more processors and system memory, as discussed in additional detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The term "digital environment," as used herein, generally refers to an environment that is implemented, for example, as a stand-alone application (e.g., a personal computer or mobile application running on a computing device), as a module of an application, as a plug-in for a application, as a library function or functions that may be called by a network application creation system, and/or as a cloud-computing system. A digital medium environment allows users to create, view, and/or edit a hybrid waveform.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
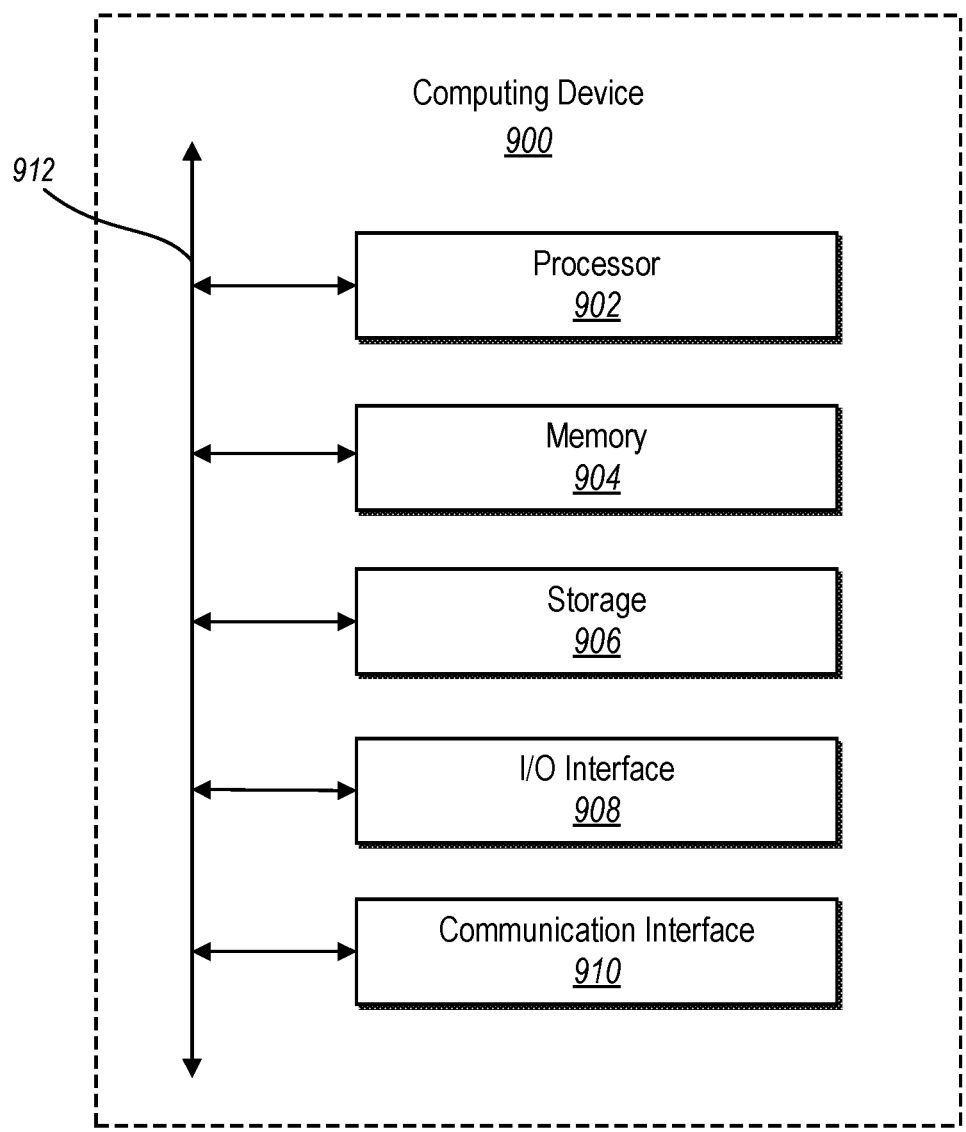
FIG. 9 illustrates a block diagram of an exemplary computing device in accordance with one or more embodiments.

FIG. 9 illustrates a block diagram of an exemplary computing device 900 that may be configured to perform one or more of the processes described above. One will appreciate that one or more computing devices, such as the computing device 900, may host the hybrid waveform system 602, and may be an example embodiment of the computing device 600 described above. As shown by FIG. 9, the computing device 900 can comprise a processor 902, memory 904, a storage device 906, an I/O interface 908, and a communication interface 910, which may be communicatively coupled by way of a communication infrastructure 912. While an exemplary computing device 900 is shown in FIG. 9, the components illustrated in FIG. 9 are not intended to be limiting. Additional or alternative components may be used in other embodiments. Furthermore, in certain embodiments, the computing device 900 can include fewer components than those shown in FIG. 9. Components of the computing device 900 shown in FIG. 9 will now be described in additional detail.

In particular embodiments, the processor 902 includes hardware for executing instructions, such as those making up a computer program. As an example and not by way of limitation, to execute instructions, the processor 902 may retrieve (or fetch) the instructions from an internal register, an internal cache, the memory 904, or the storage device 906 and decode and execute them. In particular embodiments, the processor 902 may include one or more internal caches for data, instructions, or addresses. As an example and not by way of limitation, the processor 902 may include one or more instruction caches, one or more data caches, and one or more translation lookaside buffers (TLBs). Instructions in the instruction caches may be copies of instructions in the memory 904 or the storage device 906.

The memory 904 may be used for storing data, metadata, and programs for execution by the processor(s). The memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 may be internal or distributed memory.

The storage device 906 includes storage for storing data or instructions. As an example and not by way of limitation, the storage device 906 can comprise a non-transitory storage medium described above. The storage device 906 may include a hard disk drive (HDD), a floppy disk drive, flash memory, an optical disc, a magneto-optical disc, magnetic tape, or a Universal Serial Bus (USB) drive or a combination of two or more of these. The storage device 906 may include removable or non-removable (or fixed) media, where appropriate. The storage device 906 may be internal or external to the computing device 900. In particular embodiments, the storage device 906 is non-volatile, solid-state memory. In other embodiments, the storage device 906 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 908 allows a user to provide input to, receive output from, and otherwise transfer data to and receive data from the computing device 900. The I/O interface 908 may include a mouse, a keypad or a keyboard, a touch screen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example and not by way of limitation, the communication interface 910 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 910 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 910 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 910 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 912 may include hardware, software, or both that couples components of the computing device 900 to each other. As an example and not by way of limitation, the communication infrastructure 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

We claim:

1. In a digital environment for producing multimedia that includes audio, a method for viewing and editing the multimedia, the method comprising:
    identifying an audio segment;
    converting, using at least one processor, at least one speech-recognizable portion of the audio segment into readable text;
    displaying, within a graphical user interface, the readable text to represent the at least one converted speech-recognizable portion of the audio segment; and
    displaying, within the graphical user interface and inline with the displayed readable text, at least one waveform to represent at least one non-speech-recognizable portion of the audio segment.

2. The method of claim 1, further comprising identifying the at least one non-speech-recognizable portion of the audio segment based on the at least one non-speech-recognizable portion satisfying an audio threshold.

3. The method of claim 2, wherein the audio threshold corresponds to an amplitude threshold or a waveform length threshold.

4. The method of claim 1, wherein the at least one waveform provides a visual representation of the at least one non-speech-recognizable portion of the audio segment.

5. The method of claim 1, further comprising:
 determining, using the at least one processor, a learned audio pattern from the at least one non-speech-recognizable portion of the audio segment; and
 replacing a waveform from the at least one waveform with descriptive text for the learned audio pattern.

6. The method of claim 1, wherein a height of the at least one waveform displayed within the graphical user interface matches a height of the displayed readable text.

7. The method of claim 1, further comprising tagging a waveform from the at least one waveform with an audio tag.

8. The method of claim 1, further comprising:
 receiving a user input deleting a portion of the displayed readable text; and
 deleting an audio portion from the audio segment that corresponds to the deleted portion of the displayed readable text.

9. The method of claim 1, further comprising:
 receiving a user input modifying a format of a portion of the displayed readable text; and
 changing at least one audio characteristic of an audio portion from the audio segment corresponding to the modified portion of the displayed readable text.

10. The method of claim 9, wherein changing the at least one audio characteristic comprises changing at least one of an amplitude, a duration, or a pitch of the audio portion corresponding to the portion of the displayed readable text.

11. The method of claim 1, further comprising coding the readable text according to speaker.

12. The method of claim 1, further comprising coding the readable text according to phonemes and sound types.

13. In a digital environment for producing multimedia that includes audio, a method for viewing and editing the multimedia, the method comprising:
 identifying an audio segment;
 detecting, by at least one processor, recognizable speech and non-recognizable speech within the audio segment;
 converting the detected recognizable speech to readable text;
 generating a plurality of waveforms for the non-recognizable speech;
 displaying, within a graphical user interface, the plurality of waveforms for the non-recognizable speech inline with the readable text;
 receiving a user input modifying a portion of readable text from the displayed readable text; and
 changing at least one audio characteristic of an audio portion in the audio segment corresponding to the modified portion of readable text based on the received user input.

14. The method of claim 13, further comprising:
 detecting, in connection with detecting the recognizable speech, acoustic characteristics of audio corresponding to the recognizable speech; and
 modifying formatting for at least one portion of readable text within the graphical user interface based on the detected acoustic characteristics to provide an indication of the detected acoustic characteristics.

15. The method of claim 13, further comprising separating each portion of readable text and each waveform into an audio unit.

16. The method of claim 15, further comprising enabling a user to individually edit each audio unit.

17. In a digital environment for producing multimedia that includes audio, a system for viewing and editing the multimedia, the system comprising:
 at least one processor; and
 at least one non-transitory computer readable storage medium storing instructions that, when executed by the at least one processor, cause the system to:
 identify an audio segment;
 convert at least one speech-recognizable portion of the audio segment into readable text;
 display, within a graphical user interface, the readable text to represent the at least one converted speech-recognizable portion of the audio segment; and
 display, within the graphical user interface and inline with the displayed readable text, at least one waveform to represent, at least one non-speech-recognizable portion of the audio segment.

18. The system of claim 17, further comprising instructions that, when executed by the at least one processor, cause the system to:
 receive a user input deleting a portion of the displayed readable text; and
 delete an audio portion from the audio segment that corresponds to the deleted portion of the displayed readable text.

19. The system of claim 17, further comprising instructions that, when executed by the at least one processor, cause the system to:
 receive a user input modifying a format of a portion of the displayed readable text; and
 change at least one audio characteristic of a an audio portion from the audio segment that corresponds to the modified portion of the displayed readable text.

20. The system of claim 19, wherein the instructions, when executed by the at least one processor, cause the system to change the at least one audio characteristic by changing at least one of an amplitude, a duration, a pitch, a fade, or a reverberation of the audio portion that corresponds to the modified portion of the displayed readable text.

* * * * *